(12) United States Patent
Chen

(10) Patent No.: US 6,481,913 B2
(45) Date of Patent: Nov. 19, 2002

(54) FRONT TUBE PRESSING DEVICE OF SCOOTER

(75) Inventor: Tsang-Ying Chen, Chang Hua Hsien (TW)

(73) Assignee: Melton International L.L.C., Dover, DE (US)

( * ) Notice: Subject to any disclaimer, the term of this patent is extended or adjusted under 35 U.S.C. 154(b) by 47 days.

(21) Appl. No.: 09/826,959

(22) Filed: Apr. 6, 2001

(65) Prior Publication Data

US 2002/0131813 A1 Sep. 19, 2002

(51) Int. Cl.[7] .............. B25G 3/20; F16B 2/14; B62M 1/00
(52) U.S. Cl. ............. 403/83; 403/368; 403/374.1; 403/374.2; 403/374.5; 403/409.1; 403/DIG. 4; 16/900; 280/87.021; 280/87.05
(58) Field of Search .............. 403/83, 121, 409.1, 403/DIG. 4, FOR 102, 368, 373, 374.1, 374.2, 374.5; 16/DIG. 14, 900; 280/87.021, 87.05

(56) References Cited

U.S. PATENT DOCUMENTS

| | | | | |
|---|---|---|---|---|
| 3,528,691 A | * | 9/1970 | Matich, Jr. | 403/356 |
| 4,089,382 A | * | 5/1978 | Pessier | 175/361 |
| 4,464,076 A | * | 8/1984 | Leibhard | 403/297 |
| 5,135,330 A | * | 8/1992 | Chen | 301/124.2 |
| 5,595,392 A | * | 1/1997 | Casillas | 280/11.223 |
| 5,737,974 A | * | 4/1998 | Chen | 280/279 |
| 6,173,976 B1 | * | 1/2001 | Lee | 280/87.041 |
| 6,182,988 B1 | * | 2/2001 | Wu | 280/87.041 |
| 6,234,501 B1 | * | 5/2001 | Chen | 16/900 |
| 6,286,845 B1 | * | 9/2001 | Lin | 16/324 |
| 6,301,749 B1 | * | 10/2001 | Chen | 16/427 |
| 6,332,621 B1 | * | 12/2001 | Wu | 16/900 |
| 6,390,483 B1 | * | 5/2002 | Hsu et al. | 280/87.041 |

FOREIGN PATENT DOCUMENTS

| DE | 100 33 450 | * | 1/2002 |
|---|---|---|---|
| GB | 2 364 739 | * | 2/2002 |

* cited by examiner

*Primary Examiner*—Gary S. Hartmann
(74) *Attorney, Agent, or Firm*—Browdy and Neimark

(57) ABSTRACT

A device is designed to secure the front tube of the handlebar of a foldable scooter and is formed of a shaft rod, two clamping members, a wrenching rod, a lashing collar, and a stop nut. The device is pivotally fastened between the front tube of the handlebar and the folding mechanism of the foldable scooter. The clamping members are actuated by the wrenching rod to hold and push a press member of the shaft rod to press against the front tube, so as to prevent the handlebar of the scooter from swaying at the time when the scooter is in motion.

7 Claims, 6 Drawing Sheets

FRONT TUBE PRESSING DEVICE OF SCOOTER

FIELD OF THE INVENTION

The present invention relates generally to a scooter, and more particularly to a front tube pressing device of the scoter to prevent the handlebar of the scooter from swaying.

BACKGROUND OF THE INVENTION

As shown in FIG. 1, a prior art scooter 1 comprises a folding mechanism 50 which is pivotally disposed between a front tube 32 of a handlebar 30 and a footboard 93. The handlebar 30 is apt to sway at the time when the scooter 90 is in operation. In order to provide a remedial measure, two upright plates 51 and 52 of the folding mechanism 50 are connected at the front end with a connection piece 95 which is provided with a threaded hole 96 and a fastening bolt 97 engaging the threaded hole 96. The tail end of the fastening bolt 97 presses against the front tube 32 of the handlebar 30 so as to prevent the handlebar 30 from swaying, as shown in FIG. 2. Such a remedial measure as described above is defective in design in that the fastening bolt 97 must be fastened securely each time when the scooter 90 is in operation, and that the frequent action of fastening the fastening bolt 97 often results in the wear of the threaded hole 96 and the fastening bolt 97, and further that the rotation of the fastening bolt 97 causes the wear of the surface of the front tube 32 by mechanical friction.

SUMMARY OF THE INVENTION

It is the primary objective of the present invention to provide a scooter with a front tube pressing device which is easy to use to stabilize the front tube and the folding mechanism.

It is another objective of the present invention to provide a scooter front tube pressing device which does not undermine the external appearance of the scooter.

The pressing device of the present invention comprises a shaft rod, two clamping members, one wrenching rod, one lashing collar, and a nut. The device of the present invention is pivotally fastened between a scooter front tube and a folding mechanism of the scooter. In operation, the wrenching rod is kept in the fastening state such that the two clamping members of the pressing device hold and push the press member of the shaft rod of the device toward the front tube of the scooter. As a result, the front tube of the scooter is securely pressed against by the press member, so as to prevent the handlebar of the scooter from swaying at such time when the scooter is in operation.

DETAILED DESCRIPTION OF THE INVENTION

Figure 1:
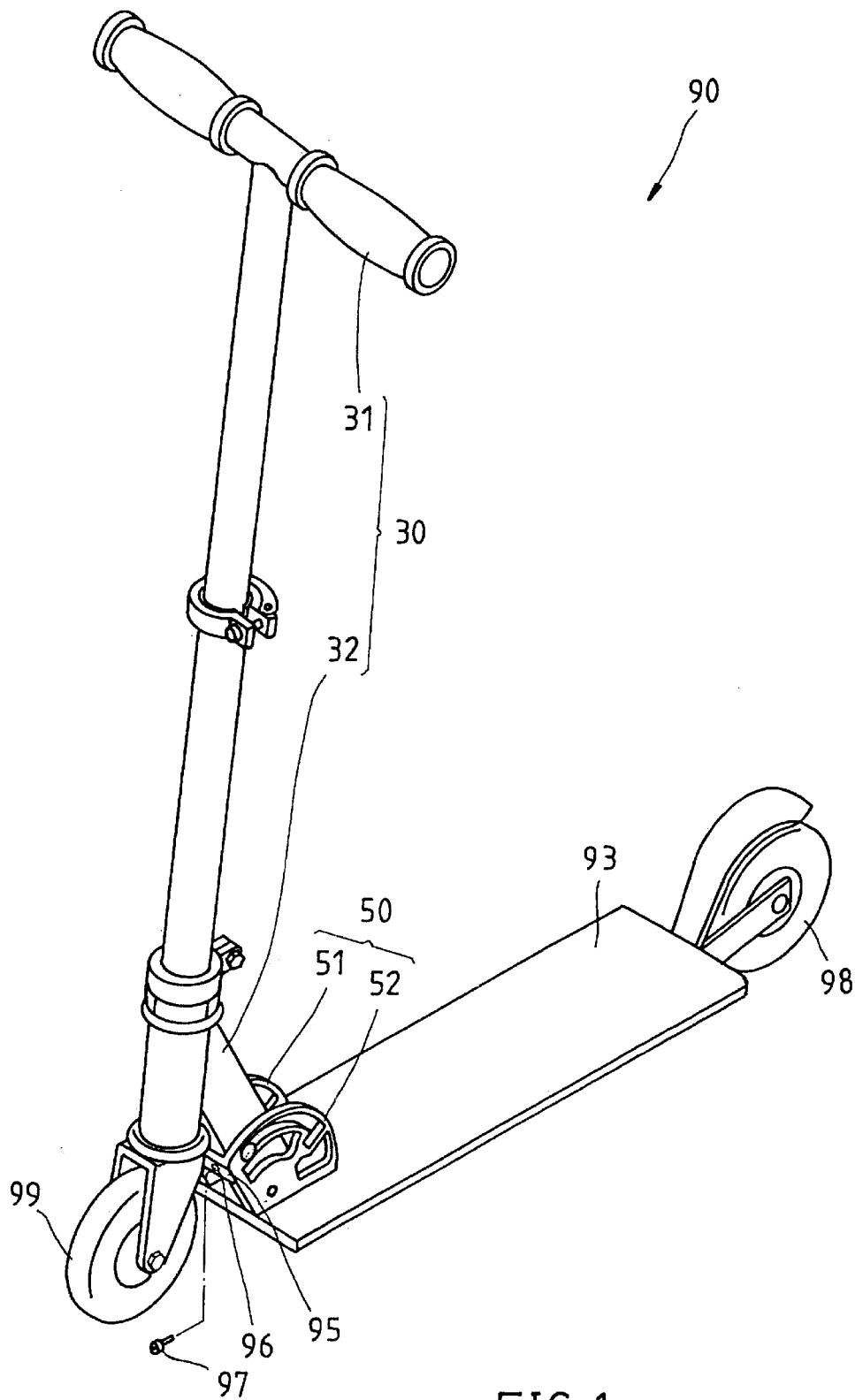
FIG. 1 shows a schematic view of a scooter front tube pressing device of the prior art.
Figure 2:
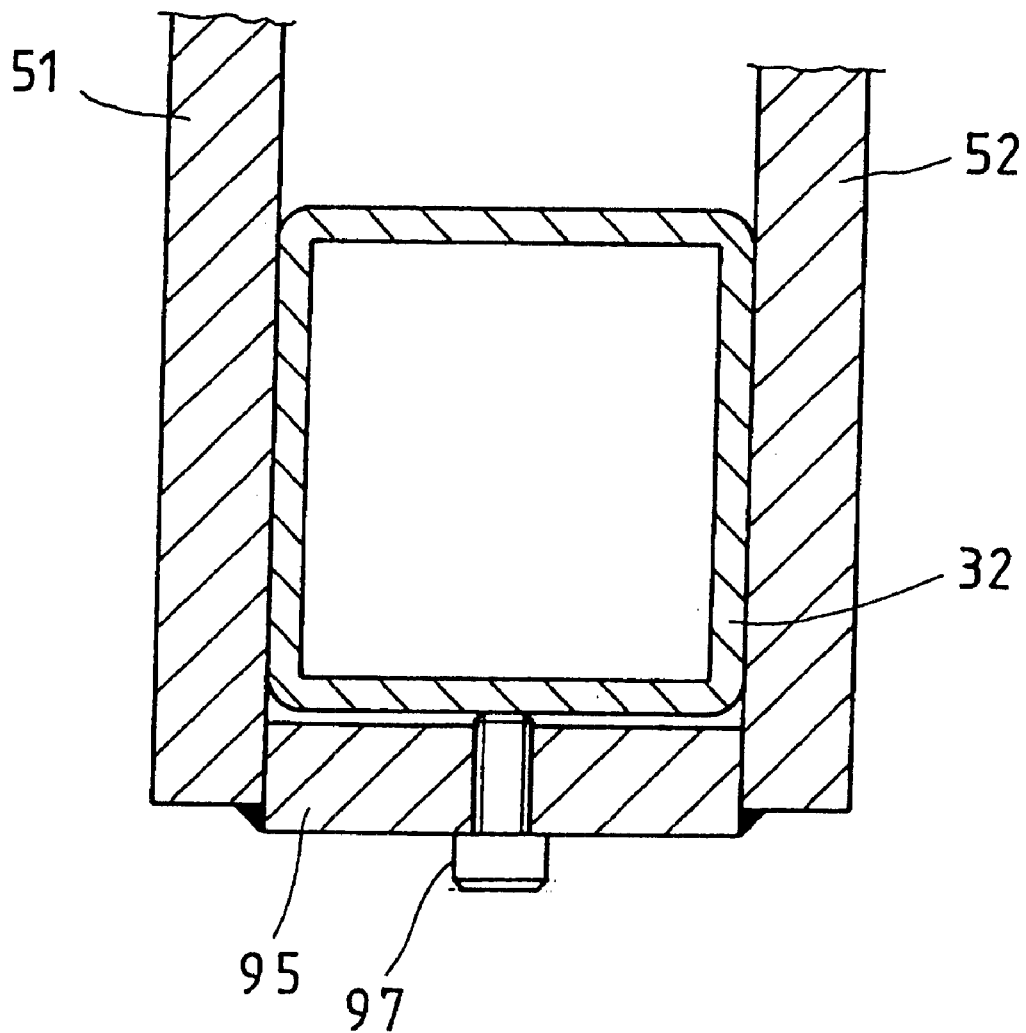
FIG. 2 shows a sectional view of the prior art scooter front tube pressing device in combination.
Figure 3:
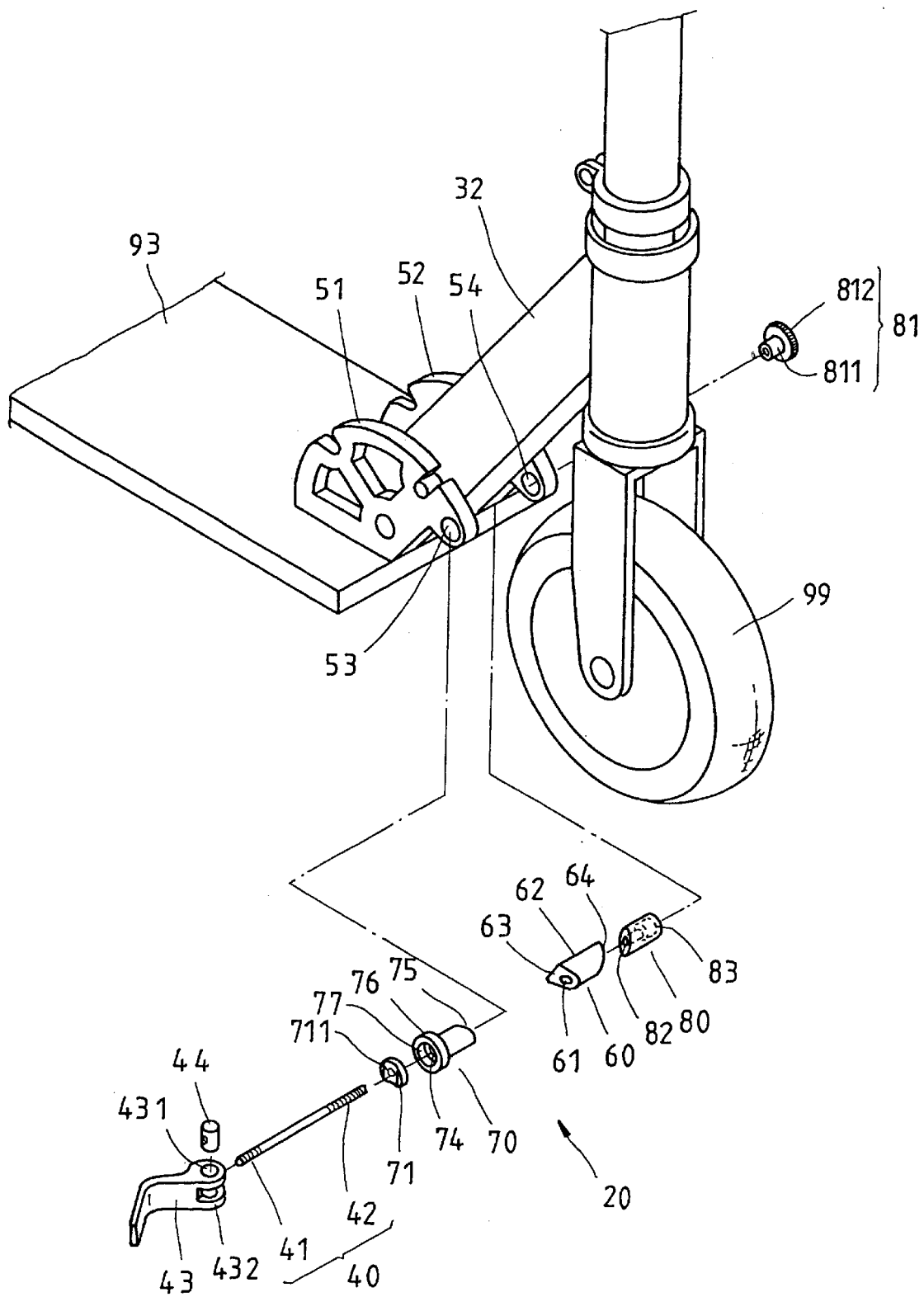
FIG. 3 shows an exploded view of a first preferred embodiment of the present invention.
Figure 4:
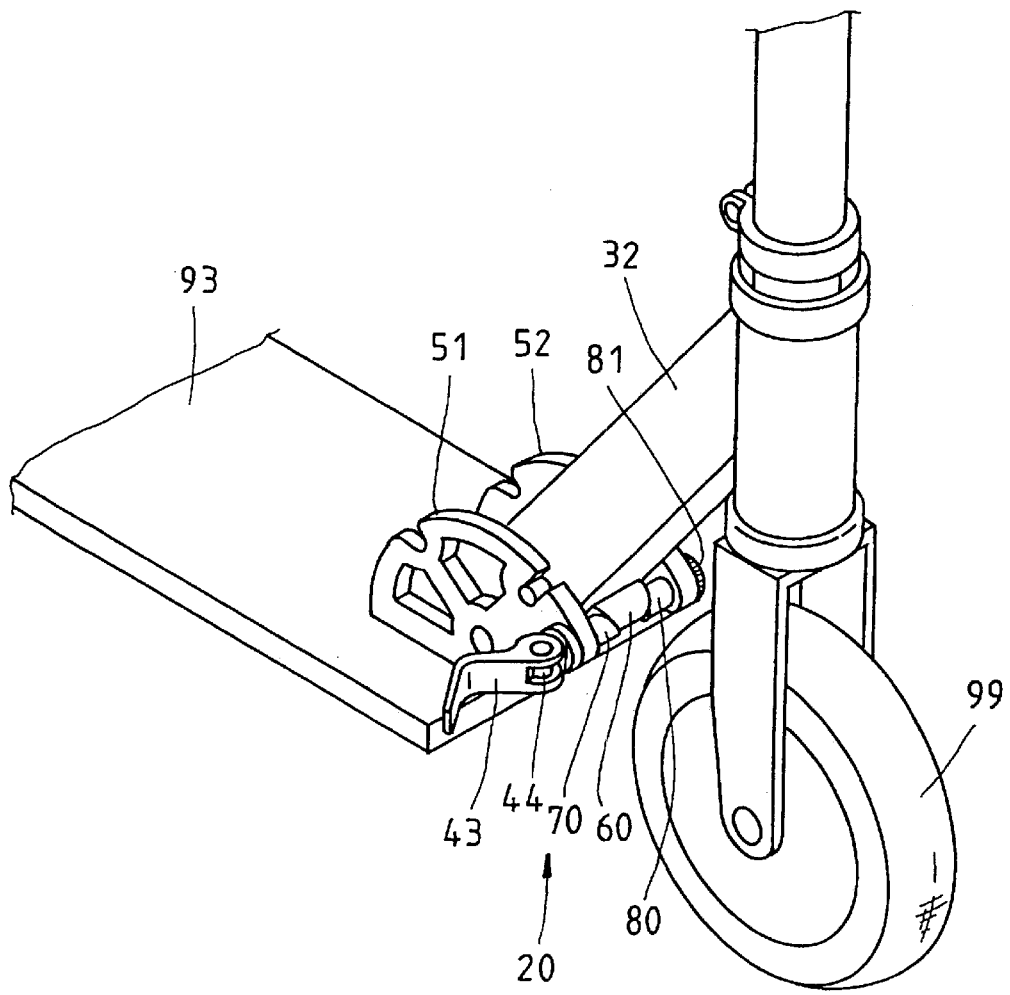
FIG. 4 shows a perspective view of the first preferred embodiment of the present invention.

As shown in FIGS. 3 and 4, a scooter front tube pressing device 20 of the present invention is pivotally fastened with two through holes 53 and 54 of two upright plates 51 and 52 of a folding mechanism 50 of a scooter 90. The folding mechanism 50 is fastened with the front end of a footboard 93 which is provided with a rear wheel 98, and a front wheel 99. A handlebar 30 is pivoted to the front end of the footboard 93 and is provided with a grip 31 and a front tube 32 connected with the folding mechanism 50.

The pressing device 20 comprises the following components.

A shaft rod 40 is put through the through holes 53 and 54 of the folding mechanism 50 and is provided at one end with a first outer threaded portion 41, and at other end with a second outer threaded portion 42.

A press member 60 is provided axially with a through hole 61 for fitting the midsection of the shaft rod 40, and in the outer edge with a flat rest portion 62 for pressing against the front tube 32. The press member 60 is further provided with a first press surface 63 and a second press surface 64. The first press surface 63 and the axial direction of the press member 60 form an angle smaller than 90 degrees. The second press surface 64 and the axial direction of the press member 60 form an angle greater than 90 degrees.

A first clamping member 70 is provided with an axial hole 74 for fitting the shaft rod 40. The first clamping member 70 has a press surface 75 contiguous to the press member 60 and in contact with the first press surface 63 of the press member 60. The first clamping member 70 is provided on its other side with a head end 76 which is greater in diameter than the through holes 53 and 54 of the folding mechanism 50 and is provided with a recess 77.

A second clamping member 80 is fitted over the shaft rod 40 and is located at the side of the press member 60 opposite the press surface 63. The second clamping member 80 is provided with a press surface 82 contiguous to the press member 60 and in contact with the second press surface 64 of the press member 60. The second clamping member 80 is provided with a receiving space 83.

A wrenching rod 43 is provided with a lashing head end 432 which is in turn provided with an eccentric axial hole 431 for accommodating a pivoting element 44 by means of which the wrenching rod 43 is fastened with the outer threaded portion 41 of the shaft rod 40.

A lashing collar 71 of a plastic or rubber material is provided at the center with a round hole 711. The lashing collar 71 is fitted over the shaft rod 40 and is located at one side of the lashing head end 432 of the wrenching rod 43.

A stop nut 81 is provided at one end with a threaded portion 811 which is engaged with the second outer threaded portion 42 of the shaft rod 40. The stop nut 81 is received in the receiving space 83 of the second clamping member 80 and is provided at other end with a stop portion 812 greater in diameter than the through holes 53 and 54 of the folding mechanism 50.

In combination, the first outer threaded portion 41 of the shaft rod 40 is fastened with the wrenching rod 43 of the pivoting element 44 and is then fitted with the lashing collar 71 1. The first clamping member 70 is fitted with the shaft rod 40 such that the lashing collar 711 is located in the recess 77 of the first clamping member 70 and is put through the through hole 53 of the upright plate. The head end 76 of the first clamping member presses against the upright plate. The press member 60 and the second clamping member 80 are fitted with the shaft rod 40 such that the press surface 75 of the first clamping member 70 is in contact with the first press surface 63 of the press member 60, and that the press surface 82 of the second clamping member is in contact with the second press surface 64 of the press member 60. The shaft rod 40 is put through the through hole 54 of the upright plate 52. Finally, the stop nut 81 is engaged with the second outer threaded portion 42 of the shaft rod 40 such that the threaded portion 811 of the stop nut 81 is disposed in the receiving space 83 of the second clamping member 80, and that the stop portion 812 of the stop nut 81 is pressed against the upright plate of the folding mechanism 50. The fastening device 20 is thus mounted on the scooter 90, as shown in FIG. 4.

Figure 5:
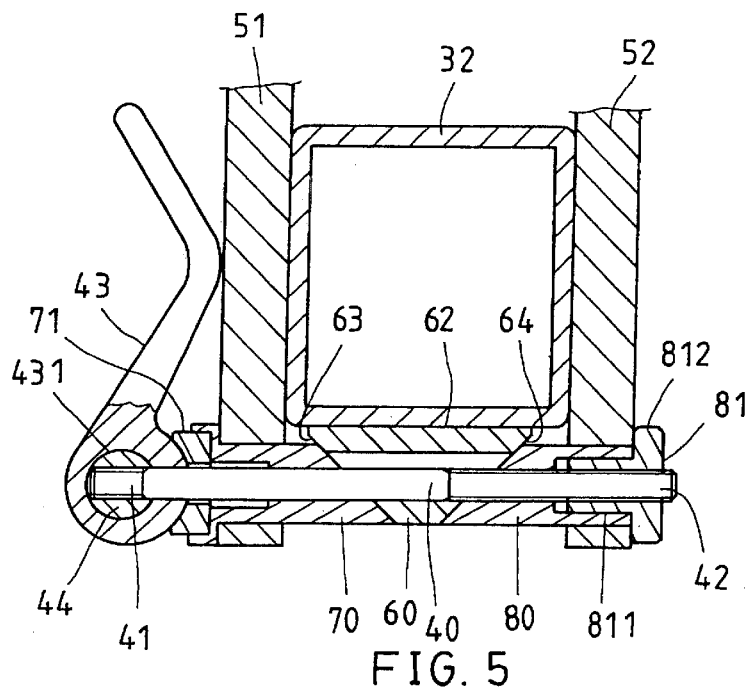
FIG. 5 shows a sectional schematic view of the first preferred embodiment of the present invention before action.

In operation, the wrenching rod 43 is turned on the pivoting element 44 such that the lashing collar 71 is pressed against by the nonuniform diametrical edges of the axial hole 431 of the wrenching rod 43, and that various components mounted on the shaft rod 40 are pressed together, and further that the press member 60 is pressed and pushed by the first clamping member 70 and that second clamping member 80 toward the front tube 32 of the scooter 90. The front tube 32 is secured in place by the press portion 62 of the press member 60, so as to prevent the handlebar 30 of the scooter 90 from swaying, as shown in FIG. 5.

Figure 6:
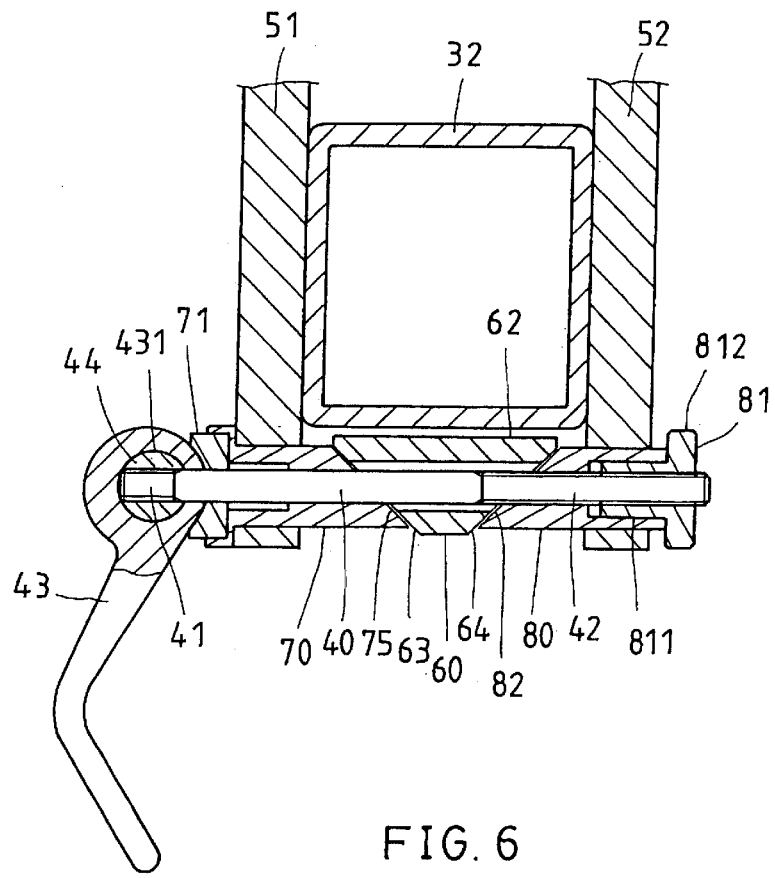
FIG. 6 shows a sectional schematic view of the first preferred embodiment of the present invention after action.

The pressing device 20 is inactivated by wrenching the wrenching rod 25 to set the lashing collar 26 free from the pressure of the nonuniform diametrical edges of the axial hole 431 of the wrenching rod 43, as shown in FIG. 6.

Figure 7:
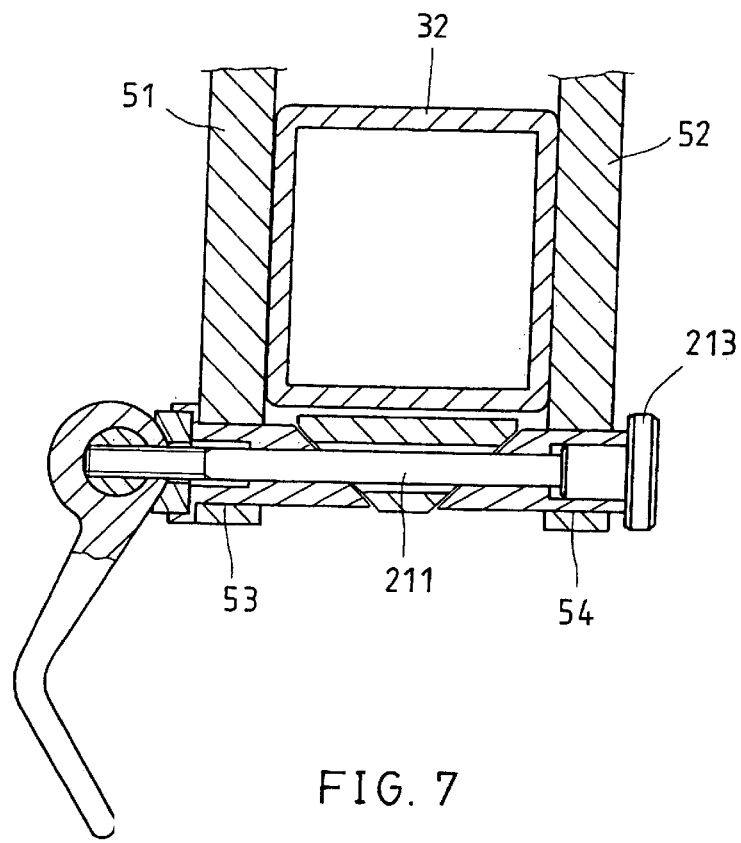
FIG. 7 shows a sectional view of a second preferred embodiment of the present invention.

As shown in FIG. 7, the second preferred embodiment of the present invention comprises a shaft rod 211 which is provided with a head end 213 greater in diameter than the through holes 53 and 54 of the folding mechanism 50. The head end 213 is intended to press against the outer side edge of the second through hole 54 of the folding mechanism 50 at the time when the wrenching rod 43 is in action, thereby resulting in the effect of the stop nut 81 of the first preferred embodiment.

Figure 8:
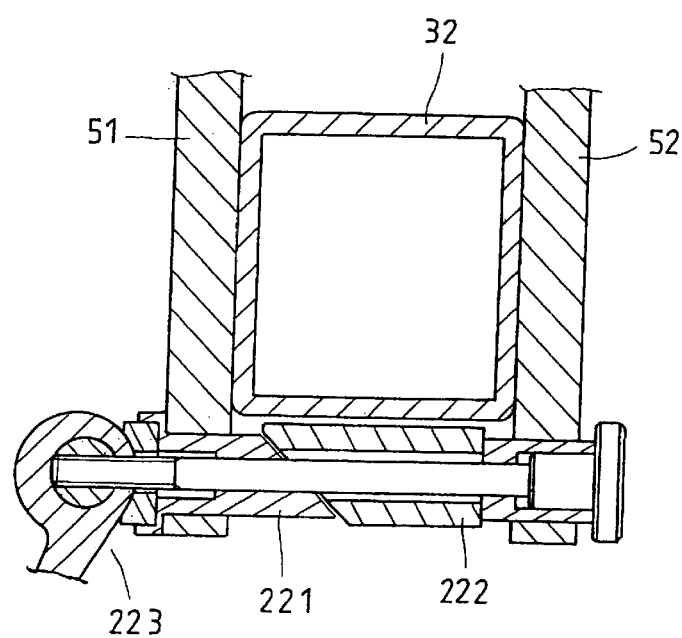
FIG. 8 shows a sectional view of a third preferred embodiment of the present invention.

As shown in FIG. 8, a pressing device 22 of the third preferred embodiment of the present invention comprises only one clamping member 221 and one press member 222 for securing the front tube 32. As the wrenching rod 223 is wrenched, the press member 222 and the clamping member 221 push against each other such that the press member 222 displaces in the direction toward the front tube 32, and that the front tube 32 is pressed against by the press member 22. The handlebar 32 of the scooter is thus prevented from swaying.

What is claimed is:

1. A device for securing a front tube of a scooter, said device comprising:

a shaft rod put through a through hole of an upright plate of a folding mechanism of the scooter, said shaft rod being provided at one end with an outer threaded portion, said shaft rod pressing against the outer side edge of the through hole of the upright plate;

a press member provided with a through hole for fitting with said shaft rod, said press member being provided with a first press surface forming with the axial direction of said press member an angle smaller than 90 degrees;

at least one clamping member provided axially with a through hole for fitting with said shaft rod such that said clamping member is located adjacent said press member, said clamping member having a press surface contiguous to said press member and in contact with said press surface of said press member; and a wrenching rod having an eccentric axial hole in which a pivoting element is disposed, with said pivoting element being engaged with said outer threaded portion of said shaft rod, thereby enabling said wrenching rod to actuate said shaft rod to displace whereby said wrenching rod is wrenched to cause said press member and said clamping member to push against each other such that said press member is moved to press against the front tube of the scooter, thereby preventing the handlebar of the scooter from swaying at the time when the scooter is in operation.

2. The device as defined in claim 1, wherein said press member is provided with a second press surface opposite to said first press surface, said second press surface forming with the axial direction of said press member an angle greater than 90 degrees.

3. The device as defined in claim 2 further comprising a second clamping member which is provided axially with a through hole for fitting with said shaft rod in such a manner that said second clamping member is located at other end of said press member, said second clamping member being provided with a press surface contiguous to said press member and in contact with said second press surface of said press member.

4. The device as defined in claim 1, wherein said press member is provided with a flat press portion; wherein said press member is moved to press against the front tube of the handlebar of the scooter such that the front tube is pressed against by said flat press portion of said press member.

5. The device as defined in claim 1, wherein said shaft rod is provided at other end with a second outer threaded portion, and a stop nut which is engaged with said second outer threaded portion such that said stop nut presses against an outer edge of the through hole of an upright plate of the folding mechanism of the scooter.

6. The device as defined in claim 1, wherein said shaft rod is provided at other end with a head end greater in diameter than the through hole of the upright plate of the folding mechanism whereby said head end presses against the outer edge of the through hole of the upright plate.

7. The device as defined in claim 1 further comprising a lashing collar which is fitted over said shaft rod such that said lashing collar is located at one side of a lashing head end of said wrenching rod.

* * * * *